United States Patent [19]

Clark et al.

[11] Patent Number: 4,840,676
[45] Date of Patent: * Jun. 20, 1989

[54] INSOLUBLE PIGMENTS AND PREPARATION THEREOF

[75] Inventors: Howard W. Clark; Tracy E. Chapman, both of Midland, Mich.

[73] Assignee: The Dow Chemical Company, Midland, Mich.

[ * ] Notice: The portion of the term of this patent subsequent to Sep. 6, 2005 has been disclaimed.

[21] Appl. No.: 876,566

[22] Filed: Jun. 20, 1986

Related U.S. Application Data

[63] Continuation-in-part of Ser. No. 748,273, Jun. 24, 1985, abandoned.

[51] Int. Cl.$^4$ ............................................. C09D 17/00
[52] U.S. Cl. .................................... 106/462; 106/463; 106/471; 106/461; 106/501; 210/683; 252/175; 252/179; 252/184; 423/463; 423/467; 423/593; 423/600
[58] Field of Search .................... 106/288, 289, 306; 423/463, 467, 593, 600; 252/175, 179, 167; 210/683

[56] References Cited

U.S. PATENT DOCUMENTS

| | | | |
|---|---|---|---|
| 2,213,641 | 9/1940 | Tainton | 252/89 |
| 2,561,695 | 7/1951 | Gustafson | 127/46 |
| 3,002,932 | 10/1961 | Duwell et al. | 252/179 |
| 3,879,525 | 4/1975 | Miyata et al. | 423/600 |
| 3,907,715 | 9/1975 | Arai et al. | 252/465 |
| 4,065,257 | 12/1977 | Coe et al. | 8/74 |
| 4,121,903 | 10/1978 | Smolka | 8/137 |
| 4,145,400 | 3/1979 | Adsetts | 423/600 |
| 4,216,084 | 8/1980 | Ikari et al. | 210/32 |
| 4,277,346 | 7/1981 | Sakotani et al. | 210/691 |
| 4,299,739 | 11/1981 | Esposito et al. | 252/545 |
| 4,326,961 | 4/1982 | Lee et al. | 210/683 |
| 4,326,978 | 4/1982 | Moesch | 252/107 |
| 4,380,453 | 4/1983 | Claiborne | 8/606 |
| 4,661,282 | 4/1987 | Clark | 106/288 B |

FOREIGN PATENT DOCUMENTS

| | | |
|---|---|---|
| 44003 | 1/1982 | European Pat. Off. . |
| 2309099 | 8/1973 | Fed. Rep. of Germany . |
| 2726192 | 12/1978 | Fed. Rep. of Germany . |
| 2814329 | 10/1979 | Fed. Rep. of Germany . |
| 132794 | 11/1978 | German Democratic Rep. . |
| 47-42493 | 12/1972 | Japan . |
| 48-8394 | 3/1973 | Japan . |
| 48-29477 | 9/1973 | Japan . |
| 48-69780 | 9/1973 | Japan . |
| 48-69797 | 9/1973 | Japan . |
| 49-3760 | 1/1974 | Japan . |
| 51-20997 | 6/1976 | Japan . |
| 51-29129 | 8/1976 | Japan . |
| 53-19555 | 6/1978 | Japan . |
| 56-98265 | 8/1981 | Japan . |
| 517567 | 6/1976 | U.S.S.R. . |
| 1544430 | 4/1979 | United Kingdom . |

OTHER PUBLICATIONS

Marino et al., "Thermal Stability of Magnesium, Aluminum Double Hydroxides Modified by Anionic Exchange," Thermochim. Acta 1982, 55(3), 377-83. (CA 97:44968).
Chemical Abstract 92:135932a "Alumina as an Ion-Exchanger and its Application. Part III. pH and Adsorption of Anionic Dyes by Alumina".
Chemical Abstract 94:144763q "Advanced Treatment of Dye Waste Water by Adsorption".
Chemical Abstract 92:112623m "Application of Sodium Aluminum Silicates in Detergents. Part VIII. Dye Equilibriums in Multicomponent Systems".
Chemical Abstract 89:79636f "Treatment of Dye-Containing Waste Water with Magnesium Compound Adsorbents".
Chemical Abstract 93:79029t "The Adsorption of Cationic Dyes on Hydrated Zirconium Oxide".
Chemical Abstract 98:166426s "Adsorption Treatment of the Wastewater from Dye Synthesis".
Chemical abstract 89:91421q (Res. Disclosure 1978, 171, 23).
Duwell et al., "The Preparation and Properties of Some Synthetic Inorganic Anion Exchangers," *Journal of Physical Chemistry*, 63, 2044-2047.

Primary Examiner—Robert A. Wax
Attorney, Agent, or Firm—Joe R. Prieto; Barbara J. Sutherland

[57] ABSTRACT

A water-insoluble pigment comprising a complex of an anion exchange material with a layered crystal structure and a water-soluble dye is disclosed. The anion exchange material may be represented by the general formula

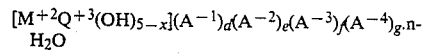

where M is a metal element or elements each with a positive valence of 2; Q is a metal element or elements each with a positive valence of 3; $A^{-1}$, $A^{-2}$, $A^{-3}$, and $A^{-4}$ are each one or more exchangeable anions each having a negative valence of 1, 2, 3, and 4, respectively; and n, x, d, e, f and g are real numbers greater than or equal to zero and satisfy the following:

$0 < x \leq 1$ $d + 2e + 3f + 4g = x$ $0 \leq n \leq 10$

44 Claims, No Drawings

INSOLUBLE PIGMENTS AND PREPARATION THEREOF

CROSS-REFERENCE TO A RELATED APPLICATION

The present application is a continuation-in-part application of application Ser. No. 748,273, filed Jun. 24, 1985, now abandoned.

BACKGROUND OF THE INVENTION

This invention relates to pigments and, more particularly, this invention relates to water-insoluble pigments which are prepared from water-soluble dyes, and methods for making such pigments.

Pigments and dyes are known in the art as coloring agents and are useful in various applications such as for coloring cosmetics, soaps, food, paints, plastics and polymers. Dyes are generally liquids or soluble solids which are used in solution. Pigments, conversely, are generally solids and are usually insoluble in the medium in which the pigment is being used. Pigments are typically preferred over dyes in applications where color migration or bleeding is undesirable. For example, if a dye is used in a toothpaste formulation, the dye may be absorbed by the tongue, teeth and gums of the user. Similarly, in a two tone bar soap, a dye in one color section of the soap may migrate to a different color portion of the soap. Further, the soap dyes may stain the skin of the user as well as sink fixtures. The use of an insoluble pigment, in these applications, prevents these undesirable occurrences.

Although there are a number of known water-insoluble pigments, some are considered to be unsuitable because they have been found to be questionable by government regulators on the ground of potential toxicity or carcinogenicity to the user. In addition, some insoluble pigments which are government-approved may suffer from a lack of color flexibility. These problems vary according to the use to which the pigments are put. In the case of soaps and cosmetics, for example, skin irritation may result from the incorporation of some known pigments.

Another issue involved is that of coloration of plastics that will be used in contact with food. Pending United States Food and Drug Administration (FDA) regulation will require certification of any colorant used in contact with food, but current plastics colorants are for the most part unlikely to qualify for such certification, and dyes and pigments currently approved for food contact do not generally exhibit the chemical and thermal stability necessary for plastics processing.

A final problem encountered in the pigment and dye area is related to commercial desirability. In producing pigments from dyes, a loss of color brightness and intensity, along with hue changes, is encountered. While use of increased amounts of pigments will help to counteract these effects, the expensive cost of the dye precursor represents significant increases in costs associated with pigment production and, ultimately, of the soap, cosmetic, food, plastic or other polymer in which the colorant will be utilized.

Thus, it would be highly desirable to provide a nontoxic, noncarcinogenic, water-insoluble pigment which is suitable for use in body contact and plastics processing applications and which has a relatively greater color flexibility. It would also be desirable to provide a method of preparing such a nontoxic, noncarcinogenic, chemically and thermally stable water-insoluble pigment.

SUMMARY OF THE INVENTION

In one aspect, the invention is a water-insoluble pigment comprising a complex of a water-insoluble inorganic anion exchange material with a layered structure and a water-soluble dye, said anion exchange material represented by the general formula:

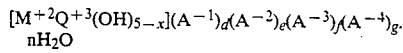

where M is a metal element or elements each with a positive valence of 2; Q is a metal element or elements each with a positive valence of 3; $A^{-1}$, $A^{-2}$, $A^{-3}$, and $A^{-4}$ are each one or more exchangeable anions each having a negative valence of 1, 2, 3, and 4, respectively; and n, x, d, e, f, and g are real numbers greater than or equal to zero and satisfy the following:

$$0 < X \leq 1$$

$$d + 2e + 3f + 4g = x$$

$$0 \leq n \leq 10$$

In another aspect, the invention is a method of preparing a water-insoluble pigment comprising contacting together the aforementioned water-insoluble inorganic anion exchange material with a layered structure and a water-soluble dye. In yet another aspect the invention is the pigment produced by the aforementioned method.

DESCRIPTION OF THE PREFERRED EMBODIMENTS

As used herein the term "pigment" is meant to include any substance, usually in finely divided (i.e., powder) form, that is highly colored and imparts color to another substance or mixture as a result of dispersion therein. The pigment is insoluble in an aqueous medium under normal conditions of use.

Preparation of pigments, according to the present invention, requires, as a first component, an anion exchange material with a layered structure and as a second component, a water-soluble dye.

By "anion exchange material with a layered structure" it is meant an essentially inorganic material characterized as exhibiting anion exchange properties, i.e., anion exchange capacity, under normal conditions of use, and a material further characterized as having a layered structure as determined by x-ray diffraction, electron diffraction, electron microscopy and micro area x-ray fluorescence analysis. The term "anion exchange material with a layered structure" will be used herein interchangeably with "layered anion exchange material" and "anion exchanger."

The preferred anion exchange material with a layered structure used in the present invention may be described by the general formula:

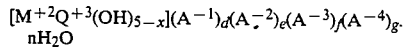

where M is a metal element or elements each with a positive valence of 2; Q is a metal element or elements each with a positive valence of 3; $A^{-1}$, $A^{-2}$, $A^{-3}$, and $A^{-4}$ are each one or more exchangeable anions each having a negative valence of 1, 2, 3, and 4, respectively; and n, x, d, e, f, and g are real numbers greater than or equal to zero and satisfy the following:

$0 < x \leq 1$ $d + 2e + 3f + 4g = x$ $0 \leq n \leq 10$

In the above equation, the metal element or elements M may be selected, for example, from divalent metals such as magnesium, calcium, strontium, barium, iron, cobalt, manganese, nickel, copper, zinc and mixtures thereof. The metal element or element Q may be selected, for example, from trivalent metals such as aluminum, iron, chromium, gallium, cobalt, rhenium, indium and mixtures thereof. In the above equation, M is preferably magnesium and Q is preferably aluminum.

The exchangeable anions of the composition of the present invention may be selected from any inorganic or organic exchangeable anions commonly known in the art of anion exchangers. The exchangeable anions may be selected from monovalent, bivalent, trivalent, tetravalent anions, or mixtures of two or more of these exchangeable anions. In the above formula, the anion $A^{-1}$, for example, may be selected from halides such as chlorides ($Cl^{-1}$); bromides ($Br^{-1}$); iodides ($I^{-1}$); and fluorides ($F^{-1}$); carbonates, such as $HCO_3^{-1}$; nitrates ($NO_3^{-1}$); sulfates such as $HSO_4^{-1}$; phosphates such as $H_2PO_4^{-1}$; hydroxides ($OH^{-1}$); and mixtures thereof. For example, the anion $A^{-1}$ may be a combination of two or more exchangeable anions described above such as a mixture of $Cl^{-1}$ and $HCO_3^{-1}$ anions. In the above formula, the anion $A^{-2}$, for example, may be an inorganic anion selected from carbonates such as $CO_3^{-2}$; sulfates such as $SO_4^{-2}$; phosphates such as $HPO_4^{-2}$; and mixtures thereof. For example, the anion $A^{-2}$ may be a combination of two or more exchangeable anions described above such as a mixture of $SO_4^{-2}$ and $CO_3^{-2}$. In the above formula, the anion $A^{-3}$, for example, may be a phosphate such as $PO_4^{-3}$. An example of the anion $A^{-4}$ used in the present invention may include organic anions such as ethylenediaminetetraacetic acid (EDTA) and diphosphates such as

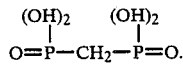

Other organic exchangeable anions used in the composition of the present invention may include, for example, acetates, stearates, formates, benzoates and mixtures thereof.

In addition to the above anions used in the present invention, the composition of the present invention may include a combination of two or more exchangeable anions selected from the group $A^{-1}$, $A^{-2}$, $A^{-3}$ and $A^{-4}$ as described above. For example, the composition may include a mixture of exchangeable anions such as $Cl^{-1}$ and $CO_3^{-2}$ anions or a mixture of $Cl^{-1}$ and $SO_4^{-2}$ anions. The total negative charge of the exchangeable anion or mixture of exchangeable anions selected for the composition should be sufficient to balance the excess positive charge of the hydroxides of the above composition.

Typical examples of the anion exchange material used in the present invention include $[MgAl(OH)_4]Cl^{-1} \cdot nH_2O$; $[MgAl(OH)_{4.7}](Cl^{-1})_{0.3} \cdot nH_2O$; $[MgAl(OH)_{4.6}](CO_3^{-2}) \cdot nH_2O$; and $[MgAl(OH)_{4.6}](Cl^{-1})_{0.2}(HCO_3^{-1})_{0.2} \cdot nH_2O$. Generally, the anion exchanger may be prepared by precipitation techniques known in the art, for example, as described in U.S. Pat. Nos. 4,333,846; 4,392,979; 4,392,480; and 4,392,961.

In preparing the anion exchange materials of the present invention, for example, metal compounds of M and Q above, such as the metal halides, sulfates, formates, hydrogen phosphate, hydroxides, acetate, nitrate, carbonates, bicarbonate, hydroxy chlorides, oxychlorides and the like or mixtures thereof including hydroxy carbonates, chlorohydroxide, and the halogenated carboxylates of metals M and Q may be coprecipitated to form the hydroxides of the above formula. The hydroxides are coprecipitated with a base such as an alkali metal base at a pH range from about 7 to about 14, preferably from about 8 to about 10, and more preferably from about 8.5 to about 9.5. Bases such as sodium hydroxide, potassium hydroxide, and ammonium hydroxide may be used. M in the above general formula is preferably magnesium and Q is preferably aluminum. The coprecipitation may be carried out at a temperature of from about 0° C. to about 100° C., preferably from about 40° C. to about 90° C. and more preferably from about 60° C. to about 80° C.

The second component of the present invention is a water-soluble dye. The term "dye", as used herein, is meant to include material that will bind, by an anion exchange mechanism, to the material to which it is applied and which will impart the appearance of a solid color to a formulation with which it is mixed. "Water-soluble dye" means that the dye is at least slightly soluble (i.e., at least about 0.01 weight percent soluble) in either pure neutral water, an aqueous salt solution, or an aqueous alkaline or acidic solution in which the dye remains chemically stable.

Any dye and mixtures of two or more dyes which will complex with the anion exchange material herein may be used. Preferably, dyes which are designated by the United States Food and Drug Administration (FDA) as Food, Drug and Cosmetic (FD&C) colors, Drug and Cosmetic (D&C) colors, and mixtures thereof may be used. For example, FD&C Blue No. 1, Blue No. 2, Green No. 3, Red No. 3, Yellow No. 5, Yellow No. 6, and mixtures thereof are preferred dyes. Examples of preferred D&C dyes include Green No. 8, Yellow No. 7, Yellow No. 10, and mixtures thereof. These dyes, and their structures and properties are well known to those skilled in the art. Further information may be obtained for instance, in "Kirk-Othmer Encyclopedia of Chemical Technology", Third Edition, Volume 6, pages 561-596.

In carrying out the method according to the present invention, the aforementioned anion exchange material compound is contacted with the dye under conditions in which a water-insoluble pigment is obtained. "Water-insoluble pigment" means that the pigment is not appreciably soluble (i.e., less than about 0.01 weight percent soluble) in either pure neutral water, an aqueous salt solution, or an aqueous alkaline or acidic solution in which the pigment remains chemically stable. Desirably, the anion exchange material and the water-soluble dye may be contacted together in a liquid medium in which the dye has been dissolved. The dye may be dissolved in water and the anion exchange material added to the water. In another embodiment, the dye may be dissolved in water and then passed through a bed of anion exchange material in an ion exchange column. Other processes which provide sufficient intimate contact between the dye and the materials may be used. Once the dye and anion exchange material are contacted together, an insoluble complex forms almost immediately.

The amount of anion exchange material and water-soluble dye used may vary. Typically, a ratio by weight of anion exchange material to water-soluble dye used is in the range of from about 1.5:1 to about 20:1.

Another process of preparing the pigment of the present invention is to precipitate the anion exchange material in the presence of the dye and other desired additives. The process may be carried out in a batch or continuous operation. Preferably, an aqueous solution of the dye and the other desired components is formed. Then an aqueous solution of the water-soluble salts of M and Q, such as previously described, is formed. Thereafter, a base such as sodium hydroxide or ammonia, the salt solution and the solution of the dye and other components are substantially simultaneously contacted together to form a precipitate. The precipitate is the pigment material according to the present invention. The metal salts of M and Q may be dissolved in water separately or together and thereafter contacted with the above solutions as described above. Sufficient base should be used to maintain the desired pH constant and to precipitate the anion exchange material.

The size of the pigment particles obtained can vary widely. Typically, for some applications, such as coloring agents for soaps, the particle size is preferably from about 200 angstroms to about 20 microns in diameter. The size of the precipitated particle obtained according to the present invention is preferably in the range of from about 200 angstroms to about 20 microns. The size of the particles can be controlled by controlling variables such as reagent selection, temperature, pH, concentration, and stirring speed during the precipitation steps. It is also to be understood that larger size particles than 20 microns can be ground to the desired size.

The various pigments produced by the method of the present invention may be used separately or in combination with each other to form different color pigment materials. For example, a yellow pigment may be blended with blue pigment to form a green pigment.

The pigments may be added to toiletries such as soaps (e.g., soap bars), toothpastes and cosmetics in amounts such that the desired color is obtained using techniques known in the art. The pigments of this invention can also be added to other items such as plastics, polymers, fabrics or food which are desirable to be colored.

When the pigments are to be used in plastics, one method of incorporation would be to use the pigment desired in either a dry powder form or as a paste or slurry in a suitable solvent. The particular solvent will depend on the plastic used. The pigment is then added or mixed with the pellets or granules of either a thermoplastic or thermoset resin at the time of processing. Because of the significant thermal stability of pigments formed from insolubilized dyes by the formulation of the present invention, a number of processing methods may be employed. These include molding by methods such as: injection molding; compression molding; vacuum forming; blow molding; structural foam, including conventional low pressure, high pressure and expanding mold using either chemical or physical blowing agents; extrusion, including profile, pipe, wire and cable, sheet and coextrusion; coinjection molding; and thermoforming. The incorporation of the insoluble pigment is accomplished by whatever method would be used to incorporate a dye colorant into the selected high polymer. These pigments, in being incorporated into the plastic material, are chemically and thermally stable. The insolubility of the dye is maintained throughout processing and in the final polymer material, so that the dye cannot be adsorbed onto any food with which it comes into contact. This feature will most likely satisfy any FDA regulations and avoid any problems of suspected or actual carcinogenicity associated with dye ingestion. Typical applications will contain a level of pigment within the range of from about 0.001 to about 0.1 percent by weight; however, these amounts will vary according to the tint strength of the pigment, the resin selected, and a number of other variables.

The pigment produced by the present invention may be used either alone or in a combination with other additives which are not detrimental to the pigment properties. Other materials or components which may be mixed with the pigment may include, for example, fillers such as clays, and extenders such as $TiO_2$, $Al_2O_3$, and $Al(OH)_3$ which will not substantially adversely affect the pigment properties. Other additives may be used, for example, to pelletize, agglomerate or coat the pigment, provided the pigment properties are not substantially adversely affected. The various additives used with the pigment will depend on the application in which the pigment is used.

In addition to using other materials as additives along with the pigments of the present invention in a designated application, certain materials may be complexed with the pigment components to increase the efficacy of the colorant. One problem encountered with pigments made from insolubilized dyes is a loss of color brightness and intensity and also color hue changes occurring during the insolubilization process. An effective way of counteracting this problem is through the complexing of a water-soluble polymer with the basic pigment complex. This can preferably be done by synthesizing the inorganic anion exchange material in the presence of a suitable amount of a water-soluble polymer, followed by addition of a water-soluble dye to the suspended precipitate. Alternatively, the water-soluble polymer can be added after the basic pigment complex has been produced. Modified suspending agents such as cellulosic materials work particularly well. These include carboxymethyl methylcellulose, carboxymethylcellulose, and other water-soluble polymers having an anionic functionality. The polymer serves to stabilize the color hue and maintain the original brightness and intensity of the dye precursor. An added advantage is that the polymer is insolubilized along with the other pigment components and thus does not affect the inert nature of the pigment particularly desired for many applications, such as in food, cosmetics, and food-contact plastics. The celluloses are of themselves, of course, physiologically inert.

It is preferable when adding a water-soluble polymer to use up to about 3 percent by weight of the polymer and up to about 40 percent by weight of the dye, the remainder being the inorganic anion exchange material. The small amount of dye needed to produce a pigment capable of imparting a given brightness level and hue stability represents a substantial cost savings in many applications, and the addition of the polymer does not affect other properties of the pigment, such as its chemical and thermal stability and physiological inertness.

The general preferred process for adding the water-soluble polymer comprises steps including dissolving the components of the selected inorganic anion exchange material in water; dissolving the water-soluble polymer in water; combining the two solutions with a source of alkalinity to precipitate the anion exchange material in the presence of the water-soluble polymer; and adding a selected water-soluble dye to the suspended precipitate. The pigment product may then be washed with suitable pH distilled water to remove excess reactants and by-products. Alternatively, the pigment can be completely synthesized first, then the water-soluble polymer added to it in aqueous solution.

The following examples are intended to illustrate the invention and are not intended to limit the scope thereof. In the examples, all parts and percentages are by weight unless otherwise specified.

EXAMPLE 1

A 500 ml first aqueous solution containing 2 g of FD&C Blue No. 1 dye and 1 g of $Na_2CO_3$ was stirred in a 1000 ml beaker. A 100 ml second aqueous solution with a concentration of 1.0M $MgCl_2$. $6H_2O$ and 1.0M $AlCl_3$. $6H_2O$ was prepared. The $MgCl_2$-$AlCl_3$ solution was then added dropwise to the first aqueous solution. The temperature was maintained at 60° C. and the pH was held constant at 9.3 by the addition of 50 percent NaOH. The resultant highly colored blue pigment material was filtered and washed.

EXAMPLE 2

A 1000 ml first aqueous solution was prepared containing 203 g of $MgCl_2$. $6H_2O$ and 243 g of $AlCl_3$. $6H_2O$. A second aqueous solution was prepared containing 600 ml of concentrated $NH_3$, 400 ml of water, and 10 g of $Na_2CO_3$. The two solutions were mixed rapidly by pumping simultaneously and separately the two solutions through two separate inlets of a "T" joint with the resultant precipitate material exiting the outlet end of the "T" joint. The precipitate was filtered and washed. The wet filter cake material was suspended 1000 ml of water. Then 20 g of FD&C Blue No. 1 dye was added to the suspension with stirring. The resultant highly colored blue pigment material was filtered and washed.

EXAMPLE 3

A 100 ml sample of an aqueous solution with a concentration of 0.5M $MgCl_2$. $6H_2O$ and 0.5M $AlCl_3$. $6H_2O$ was added with stirring to a 500 ml beaker containing 200 ml of water. The temperature was maintained at 60° C. and the pH was held at 9.3 by the addition of 50 percent NaOH. The resultant precipitate was then filtered and washed. The resultant filter cake was then suspended in 500 ml of water. Then 2 g of FD&C Blue No. 1 dye was added to the suspension with stirring. The resultant highly colored blue pigment material was filtered, washed with water, and dried at 110° C. for five hours.

EXAMPLE 4

A layered material of the form [MgAl(OH)$_4$]Cl was prepared as follows: A 100 g sample of sodium aluminate was dissolved in 500 ml of water. A 200 g sample of $MgCl_2$. $6H_2O$ was dissolved in 400 ml of water. The MgCl solution was added dropwise to the sodium aluminate solution together with sufficient sodium hydroxide to keep the pH at 9.5. The resultant solid was filtered, washed, and dried.

A 20 g sample of the solid was slurried in water. Then 4 g of FD&C Blue No. 1 dye was added to the slurry with stirring. The resultant highly colored blue pigment material was filtered, washed, and dried at 110° C. for four hours.

EXAMPLE 5

A 500 ml first aqueous solution containing 1.8 g of D&C Green No. 8 dye, 0.2 g of FD&C Blue No. 1 dye, and 1.0 g of $Na_2CO_3$ was stirred in a 1000 ml beaker. A 100 ml second solution with a concentration of 1.0M $MgCl_2$$6H_2O$ and 1.0M $AlCl_3$. $6H_2O$ was prepared. The $MgCl_2$-$AlCl_3$ solution was added dropwise to the first aqueous solution. The temperature was maintained at 60° C. and the pH was held constant at 9.3 by the addition of 50 percent NaOH. The resultant highly colored green pigment material is filtered and washed.

EXAMPLE 6

A 1000 ml first aqueous solution was prepared containing 203 g of $MgCl_2$. $6H_2O$ and 243 g of $AlCl_3$. $6H_2O$. A second solution was prepared containing 600 ml of concentrated $NH_3$, 400 ml of water, and 10 g of $Na_2CO_3$. The two solutions were mixed rapidly by pumping simultaneously and separately through two separate inlets of a "T" joint with the resultant precipitate material exiting the outlet end of the "T" joint. The precipitate was filtered and washed. The wet filter cake material was suspended in 1000 ml of water. Then 18 g of D&C Green No. 8 dye and 2 g of FD&C Blue No. 1 were added to the suspension with stirring. The resultant highly colored green pigment material was filtered and washed.

EXAMPLE 7

A 100 ml sample of an aqueous solution with a concentration of 0.5M $MgCl_2$. $6H_2O$ and 0.5M $AlCl_3$. $6H_2O$ was added with stirring to a 500 ml beaker containing 200 ml of water. The temperature was maintained at 60° C. and the pH was held at 9.3 by the addition of 50 percent NaOH. The precipitate was then filtered and washed. The resultant filter cake was then suspended in 500 ml of water. 1.8 g of D&C Green No. 8 dye and 0.2 g of FD&C Blue No. 1 were added with stirring. The resultant highly colored green pigment material was filtered, washed with water, and dried at 110° C. for five hours.

EXAMPLE 8

A layered material of the form [MgAl(OH)$_4$]Cl was prepared as follows: A 100 g sample of sodium aluminate was dissolved in 500 ml of water. A 200 g sample of $MgCl_2$. $6H_2O$ was dissolved in 400 ml of water. The MgCl solution was added dropwise to the sodium aluminate solution together with sufficient sodium hydroxide to keep the pH at 9.5. The resultant solid was filtered, washed, and dried.

A 20 g sample of the solid was slurried in water. Then 3.6 g of D&C Green No. 8 dye and 0.4 g of FD&C Blue No. 1 were added to the slurry with stirring. The resultant highly colored green pigment material was filtered, washed, and dried at 110° C. for four hours.

EXAMPLE 9

A 500 ml first aqueous solution containing 2 g of D&C Green No. 8 dye and 1 g of $Na_2CO_3$ was stirred in a 1000 ml beaker. A 100 ml second aqueous solution with a concentration of 1.0M $MgCl_2$. $6H_2O$ and 1.0M $AlCl_3$. $6H_2O$ was prepared. The $MgCl_2$-$AlCl_3$ solution was then added dropwise to the first aqueous solution. The temperature was maintained at 60° C. and the pH was held constant at 9.3 by the addition of 50 percent NaOH. The resulting highly colored yellow-green pigment material was filtered and washed.

EXAMPLE 10

A 1000 ml first aqueous solution was prepared containing 203 g of $MgCl_2 \cdot 6H_2O$ and 243 g of $AlCl_3 \cdot 6H_2O$. A second solution was prepared containing 600 ml of concentrated $NH_3$, 400 ml of water, and 10 g of $Na_2CO_3$. The two solutions were mixed rapidly by pumping simultaneously and separately the two solutions through two separate inlets of a "T" joint with the resultant precipitate material exiting the outlet end of the "T" joint. The precipitate was filtered and washed. The wet filter cake material was suspended in 1000 ml of water. Then 20 g of D&C Green No. 8 dye was added to the suspension with stirring. The resultant highly colored yellow-green pigment material was filtered and washed.

EXAMPLE 11

A 100 ml sample of an aqueous solution with a concentration of 0.5M $MgCl_2 \cdot 6H_2O$ and 0.5 M $AlCl_3 \cdot 6H_2O$ was added with stirring to a 500 ml beaker containing 200 ml of water. The temperature was maintained at 60° C. and the pH was held at 9.3 by the addition of 50 percent NaOH. The resultant precipitate was then filtered and washed. The resultant filter cake was then suspended in 500 ml of water and 2 g of D&C Green No. 8 dye was added to the suspension with stirring. The resultant highly colored yellow-green pigment material was filtered, washed with water, and dried at 110° C. for five hours.

EXAMPLE 12

A layered material of the form $[MgAl(OH)_4]Cl$ was prepared as follows: A 100 g sample of sodium aluminate was dissolved in 500 ml of water. A 200 g sample of $MgCl_2 \cdot 6H_2O$ was dissolved in 400 ml of water. The MgCl solution was added dropwise to the sodium aluminate solution together with sufficient sodium hydroxide to keep the pH at 9.5. The resultant solid was filtered, washed, and dried.

A 20 g sample of the solid was slurried in water. Then 4 g of D&C Green No. 8 dye was added to the slurry with stirring. The resultant highly colored yellow-green pigment material was filtered, washed, and dried at 110° C. for four hours.

EXAMPLE 13

About 100 g of $MgCl_2 \cdot 6H_2O$ and about 29.7 g $AlCl_3 \cdot 6H_2O$ and about 5 g $MgCO_3$ were dissolving in 250 ml of $H_2O$ and then coprecipitated in 300 ml of 1 percent carboxymethyl methycellulose at pH 11 by the addition of 50 percent sodium hydroxide. The resulting precipitate was diluted to 800 ml. A 100 ml portion was mixed with 0.125 g D&C Green No. 8 dye. The product was centrifuged, washed with distilled water at pH 11 and recentrifuged. The final product was a wet cake material with uniform color, smooth texture and fluorescent-like brightness which was not soluble in water from pH 7 to 12. In particular, the pigment retained a hüe and brightness very similar to that of the water-soluble dye.

What is claimed is:

1. A water-insoluble pigment comprising a complex of a water insoluble inorganic anion exchange material with a layered structure and a water-soluble dye, said anion exchange material represented by the general formula $$[M^{+2}Q^{+3}(OH)_{5-x}](A^{-1})_d(A^{-1})_e(A^{-3})_f(A^{-4})_g \cdot nH_2O$$

where M is a metal element or elements each with a positive valence of 2; Q is a metal element or elements each with a positive valence of 3; $A^{-1}$, $A^{-2}$, $A^{-3}$, and $A^{-4}$ are each one or more exchangeable anions each having a negative valence of 1, 2, 3, and 4, respectively; and n, x, d, e, f and g are real numbers greater than or equal to zero and satisfy the following:

$$0 < x \leq 1$$

$$d + 2e + 3f + 4g = x$$

$$0 \leq n \leq 10.$$

2. The pigment of claim 1 wherein M is magnesium.
3. The pigment of claim 1 wherein Q is aluminum.
4. The pigment of claim 1 wherein M is magnesium and Q is aluminum.
5. The pigment of claim 1 wherein x is 1.
6. The pigment of claim 1 wherein $A^{-1}$ is one or more anions selected from the group consisting of halides, hydroxides, nitrates, phosphates, hydrogen carbonates, hydrogen sulfates, and mixtures thereof; $A^{-2}$ is one or more anions selected from the group consisting of phosphates, carbonates, sulfates, and mixtures thereof; $A^{-3}$ is one or more anions consisting of phosphates; and $A^{-4}$ is one of more anions selected from the group consisting of ethylenediaminetetraacetic acid, diphosphates, and mixtures thereof.
7. The pigment of claim 1 wherein $A^{-1}$ is selected from the group consisting essentially of chlorides, bromides, iodides, fluorides and mixtures thereof and e, f, and g are 0.
8. The pigment of claim 1 wherein $A^{-2}$ is $CO_3^{-2}$ and d, f, and g are 0.
9. The pigment of claim 1 wherein $A^{-1}$ is $Cl^{-1}$, $A^{-2}$ is $CO_3^{2}$ and f and g are 0.
10. The pigment of claim 1 wherein $A^{-1}$ is a mixture of $Cl^{-1}$ and $HCO_3^{-1}$ and e, f, and g are 0.
11. The pigment of claim 1 wherein $A^{-1}$ is a mixture of $Cl^{-1}$ and $HCO_3^{-1}$, $A^{-2}$ is $CO_3^{-2}$ and f and g are 0.
12. The pigment of claim 4 wherein the anion exchange material is $[MgAl(OH)_4]Cl \cdot nH_2O$.
13. The pigment of claim 1 wherein the dye is an anionic dye.
14. The pigment of claim 13 wherein the dye is a sulfonated dye.
15. The pigment of claim 13 wherein the dye is a FD&C dye.
16. The pigment of claim 13 wherein the dye is a D&C dye.
17. The pigment of claim 15 wherein the dye is selected from the group consisting essentially of FD&C Blue No. 1, Blue No. 2, Green No. 3, Red No. 3, Yellow No. 5, Yellow No. 6 and mixtures thereof.
18. The pigment of claim 16 wherein the dye is selected from the group consisting essentially of D&C Green No. 8, Yellow No. 7, Yellow No. 10 and mixtures thereof.
19. The pigment of claim 17 wherein the dye is FD&C Green No. 3.
20. The pigment of claim 18 wherein the dye is D&C Green No. 8.
21. A soap containing the pigment of claim 1.

22. A method of preparing a water-insoluble pigment comprising contacting together an anion exchange material having a layered structure, and a water-soluble dye, said anion exchange material represented by the general formula:

$$[M^{+2}Q^{+3}(OH)_{5-x}](A^{-1})_d(A^{-2})_e(A^{-3})_f(A^{-4})_g \cdot nH_2O$$

where M is a metal element or elements each with a positive valence of 2; Q is a metal element or elements each with a positive valence of 3; $A^{-1}$, $A^{-2}$, $A^{-3}$ and $A^{-4}$ are each one or more exchangable anions each having a negative valence of 1, 2, 3, and 4 respectively; and n, x, d, e, f, and g are real numbers greater than or equal to zero and satisfy the following:

$$0 < x \leq 1$$

$$d + 2e + 3f + 4g = x$$

$$0 \leq n \leq 10.$$

23. The method of claim 22 wherein M is magnesium and Q is aluminum.

24. The pigment of claim 1 wherein $A^{-1}$ is one or more anions selected from the group consisting of halides, hydroxides, nitrates, phosphates, hydrogen carbonates, hydrogen sulfates, and mixtures thereof; $A^{-2}$ is one or more anions selected from the group consisting of phosphates, carbonates, sulfates, and mixtures thereof; $A^{-3}$ is one or more anions consisting of phosphates; and $A^{-4}$ is one of more anions selected from the group consisting of ethylenediaminetetraacetic acid, diphosphates, and mixtures thereof.

25. The method of claim 22 wherein $A^{-1}$ is selected from the group consisting essentially of chlorides, bromides, iodides, fluorides and mixtures thereof and e, f, and g are 0.

26. The method of claim 22 wherein the anion exchange material with a layered structure is $[MgAl(OH)_4]Cl \cdot nH_2O$.

27. The method of claim 22 wherein the dye is an anionic dye.

28. The method of claim 27 wherein the dye is a sulfonated dye.

29. The method of claim 27 wherein the dye is a FD&C dye.

30. The method of claim 27 wherein the dye is a D&C dye.

31. The method of claim 29 wherein the dye is selected from the group consisting essentially of FD&C Blue No. 1, Blue No. 2, Green No. 3, Red No. 3, Yellow No. 5, Yellow No. 6 and mixtures thereof.

32. The method of claim 30 wherein the dye is selected from the group consisting essentially of D&C Green No. 8, Yellow No. 7, Yellow No. 10, and mixtures thereof.

33. The method of claim 31 wherein the dye is FD&C Green No. 3.

34. The method of claim 32 wherein the dye is Green No. 8.

35. The method of claim 22 wherein the anion exchange material and water-soluble dye are contacted together in an aqueous medium.

36. The method of claim 22 wherein the anion exchange material and the water-soluble dye are each separately placed in an aqueous medium prior to contacting together.

37. A thermoplastic resin containing the pigment of claim 1.

38. A thermoset resin containing the pigment of claim 1.

39. The pigment of claim 1 wherein the complex also comprises a water-soluble polymer.

40. The pigment of claim 39 wherein said water-soluble polymer is a modified suspending agent.

41. The pigment of claim 40 wherein said modified suspending agent is a cellulose.

42. The method of claim 22 wherein a water-soluble polymer is further contacted.

43. A pigment produced by the method of claim 42.

44. A pigment produced by the method of claim 23.

* * * * *

UNITED STATES PATENT AND TRADEMARK OFFICE
CERTIFICATE OF CORRECTION

PATENT NO. : 4,840,676
DATED : June 20, 1989
INVENTOR(S) : Howard W. Clark and Tracy E. Chapman It is certified that error appears in the above-identified patent and that said Letters Patent is hereby corrected as shown below:

Column 7, lines 37-38 please delete "suspended 1000" and insert -- suspended in 1000 --.

Column 8, line 9 please delete "$MgCl_2 6H_2O$" and insert -- $MgCl_2 \cdot 6H_2O$ --.

Column 9, line 55 please delete "methycellulose" and insert -- methylcellulose --.

Column 10, lines 4-5 please delete

"$[M^{+2}Q^{+3}(OH)_{5-x}](A^{-1})_d(A^{-1})_e(A^{-3})_f(A^{-4})_g \cdot nH_2O$" and insert -- $[M^{+2}Q^{+3}(OH)_{5-x}](A^{-1})_d(A^{-2})_e(A^{-3})_f(A^{-4})_g \cdot nH_2O$ --.

Column 10, line 31 please delete "of" and insert -- or --.

Column 10, line 41 please delete "$CO_3^{2}$" and insert -- $CO_3^{-2}$ --.

UNITED STATES PATENT AND TRADEMARK OFFICE
CERTIFICATE OF CORRECTION

PATENT NO. : 4,840,676

DATED : June 20, 1989

INVENTOR(S) : Howard W. Clark and Tracy E. Chapman

It is certified that error appears in the above-identified patent and that said Letters Patent is hereby corrected as shown below:

Column 11, line 32 please delete "of" and insert -- or --.

Signed and Sealed this

Twenty-fourth Day of July, 1990

Attest:

HARRY F. MANBECK, JR.

Attesting Officer

Commissioner of Patents and Trademarks